United States Patent
Yuan et al.

(10) Patent No.: US 11,645,130 B2
(45) Date of Patent: May 9, 2023

(54) RESOURCE MANAGER FOR TRANSACTION PROCESSING SYSTEMS

(71) Applicant: International Business Machines Corporation, Armonk, NY (US)

(72) Inventors: Jack Chiu-Chiu Yuan, San Jose, CA (US); Jeffrey L. Maddix, Morgan Hill, CA (US); Elvis B. Halcrombe, San Jose, CA (US); Chih-Fang Li, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 17/089,784

(22) Filed: Nov. 5, 2020

(65) Prior Publication Data

US 2022/0138037 A1 May 5, 2022

(51) Int. Cl.
*G06F 11/07* (2006.01)
*G06F 9/46* (2006.01)
*H04L 41/5025* (2022.01)

(52) U.S. Cl.
CPC .......... *G06F 11/0709* (2013.01); *G06F 9/466* (2013.01); *G06F 11/0793* (2013.01); *H04L 41/5025* (2013.01)

(58) Field of Classification Search
CPC .... G06F 11/0793; G06F 9/466; G06F 9/5011; G06F 9/5022; G06F 9/5027;
(Continued)

(56) References Cited

U.S. PATENT DOCUMENTS 6,970,425 B1 * 11/2005 Bakshi ............... H04L 67/1008
709/225
7,818,745 B2 10/2010 Snyder
(Continued)

FOREIGN PATENT DOCUMENTS

JP 2921458 B2 7/1999
JP 2011123724 A * 6/2011

OTHER PUBLICATIONS

Clarivate Analytics translation of JP-2011123724-A (Year: 2022).*
(Continued)

*Primary Examiner* — Gabriel Chu
(74) *Attorney, Agent, or Firm* — Gavin Giraud

(57) ABSTRACT

A resource manager (RM) instance is associated with each transaction processing system (TPS) member, of a TPS group. Each RM instance monitors performance of the associated TPS member. If a TPS member becomes unavailable for any reason (a failing TPS), the associated RM instance broadcasts status of the failing TPS to RMs associated "surviving" members of the group. RM instances associated with surviving members initiate a series of actions that reduce the resources used by the surviving TPS members. Consequently, the surviving TPS members are better able to process the additional workload imposed on them due to the unavailability of the failing TPS. Once the failing TPS is brought back online and made available again (or a replacement TPS is brought online), RM instances associated with the surviving members perform actions to undo the resource usage reduction tasks, and the TPS group returns to a nominal configuration.

20 Claims, 7 Drawing Sheets

(58) Field of Classification Search
CPC .............. G06F 9/5083; G06F 9/5088; G06F 2209/503; G06F 2209/504; G06F 2209/206; G06F 2209/5019; H04L 41/5025; H04L 41/5003; H04L 41/5019; H04L 41/5022; H04L 65/80; H04L 67/61; H04L 67/60; H04L 67/1004; H04L 67/1008; H04L 67/101; H04L 67/1012; H04L 67/1014; H04L 67/1029; H04L 67/1031; H04L 67/1034
See application file for complete search history.

(56) References Cited

U.S. PATENT DOCUMENTS

| | | | |
|---|---|---|---|
| 8,296,783 | B1 | 10/2012 | Piira et al. |
| 8,818,988 | B1 | 8/2014 | Brown et al. |
| 9,195,528 | B1* | 11/2015 | Sarda ................ G06F 11/00 |
| 2002/0161604 | A1 | 10/2002 | Kardos et al. |
| 2005/0071307 | A1 | 3/2005 | Snyder |
| 2007/0011682 | A1 | 1/2007 | Loboz et al. |
| 2008/0253283 | A1* | 10/2008 | Douglis .............. H04L 67/1036 370/228 |
| 2011/0270910 | A1 | 11/2011 | Floyd et al. |
| 2011/0292792 | A1* | 12/2011 | Zuo .................... H04L 41/0896 370/230 |
| 2018/0246778 | A1 | 8/2018 | Bearden |
| 2019/0342380 | A1* | 11/2019 | Thota .................. G06F 11/2023 |
| 2021/0049029 | A1* | 2/2021 | Kumble .............. G06F 9/45558 |

OTHER PUBLICATIONS

"Patents Act 1977: Combined Search and Examination Report under Sections 17 and 18(3)", Reference: DP/P49746GB Application No. GB2114898.6, dated Jul. 5, 2022, 11 pages.

Subramanian et al., "Meeting performance goals with the HP-UX workload manager", 1st Workshop on Industrial Experiences with Systems Software (WIESS 2000), Oct. 22, 2000, San Diego, California, 2 pages.

* cited by examiner

RESOURCE MANAGER FOR TRANSACTION PROCESSING SYSTEMS

BACKGROUND

The present invention relates generally to the field of transaction processing, and more particularly to transaction processing system response to a constrained resource event.

A transaction processing system (TPS) receives transaction requests and processes the requests in near real time. A transaction may involve banking, credit/debit card, database, and/or ticket sales transactions, to name a just a few examples. A TPS may comprise many individual systems, working in a group to process large volumes of incoming transactions requests within response time specifications. Features of a TPS include continuous availability, data integrity, even if some TPS components fail, and ability to expand or contract as workloads vary.

SUMMARY

According to an aspect of the present invention, there is a method, computer program product and/or system that performs the following operations (not necessarily in the following order): (i) determining a first status, of a first transaction processing system (TPS) member of a group of TPS members, is "unavailable"; (ii) in response to determining the first status of the first TPS member, broadcasting a first message to a second TPS member of the group of TPS members, wherein the first message includes information with respect to the first status of the first TPS member; and (iii) in response to receiving the first message, implementing, by the second TPS member, a resource usage reduction action.

DETAILED DESCRIPTION

Figure 1:
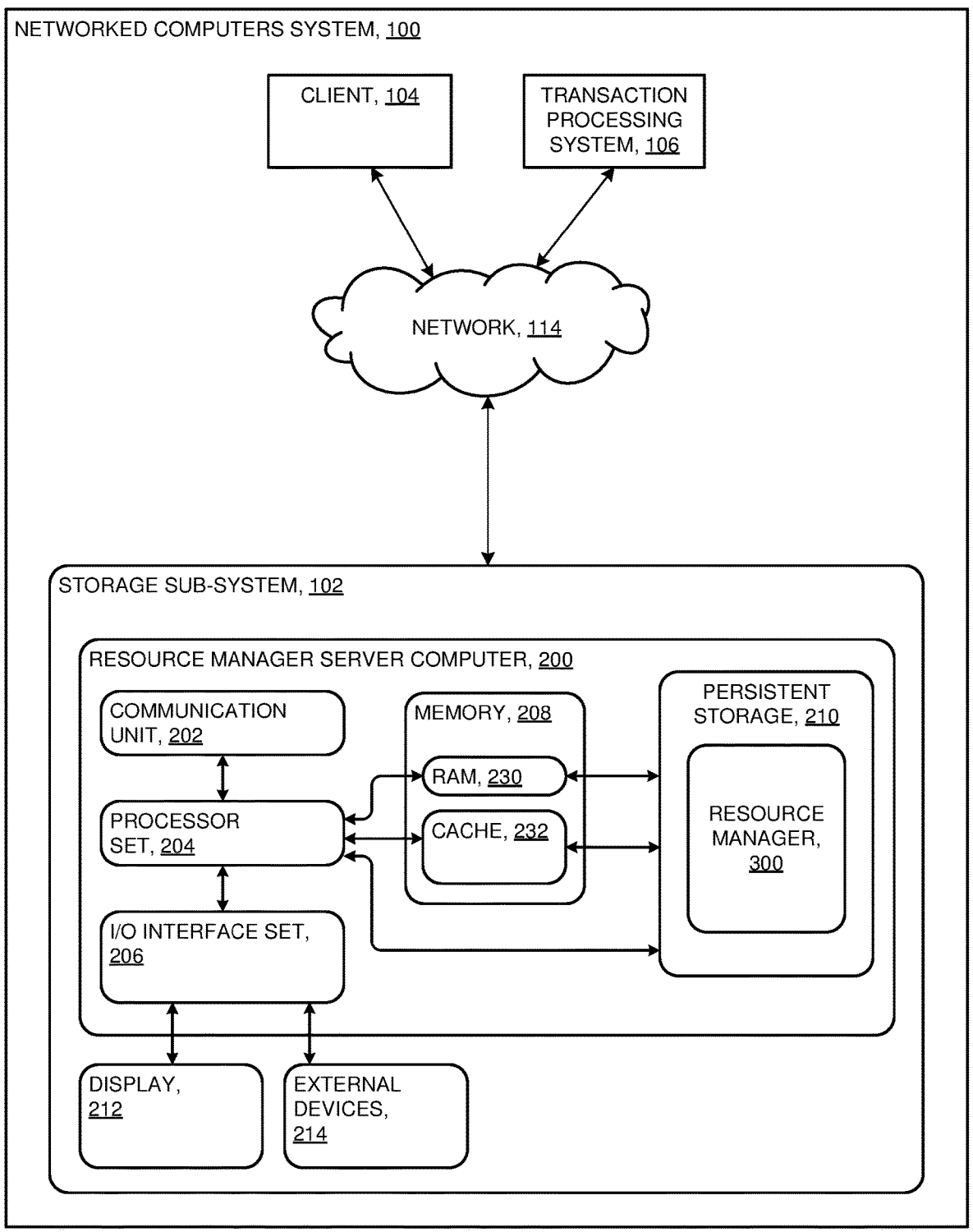
FIG. 1 is a block diagram of a system in accordance with at least one embodiment of the present invention.

Some embodiments of the present invention add a resource manager (RM) component to a transaction processing system (TPS). More particularly, an instance of the RM is hosted by each TPS member of a TPS group. Each RM instance monitors the performance of the hosting TPS. If a TPS member goes down, or becomes unavailable to process incoming transactions, the RM instance hosted by the failing TPS broadcasts status of the failing TPS to other (surviving) members of the TPS group. RM instances hosted by surviving members of the TPS group initiate a series of actions that reduce the resources used by the respectively corresponding surviving members, such that the surviving members are better able to process the additional workload imposed on them due to the unavailability of the failing TPS. Once the failing TPS (or a replacement TPS) is brought back online and made available again, RM instances hosted by the surviving members of the TPS group perform actions to undo the resource usage reduction tasks and the TPS group returns to a nominal configuration.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: storage sub-system 102; client computer 104, transaction processing system (TPS) 106; communication network 114; resource manager (RM) server computer 200; communication unit 202; processor set 204; input/output (I/O) interface set 206; memory 208; persistent storage 210; display 212; external devices 214; random access memory (RAM) 230; cache 232; and resource manager (RM) 300.

Storage sub-system 102 is, in many respects, representative of the various computer sub-system(s) in the present invention. Accordingly, several portions of storage sub-system 102 will now be discussed in the following paragraphs.

Storage sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. RM 300 is a collection of machine readable instructions and/or data that is used to create, manage, and control certain software functions that will be discussed in detail, below, in the Example Embodiment sub-section of this Detailed Description section.

Storage sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Storage sub-system 102 is shown as a block diagram with many double arrows. These double arrows (no separate reference numerals) represent a communications fabric, which provides communications between various components of storage sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external devices 214 may be able to supply, some or all, memory for storage sub-system 102; and/or (ii) devices external to storage sub-system 102 may be able to provide memory for storage sub-system 102.

RM 300 is stored in persistent storage 210 for access and/or execution by one or more of the respective computer processor set 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

RM 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communication unit 202, in these examples, provides for communications with other data processing systems or devices external to storage sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage 210) through a communications unit (such as communication unit 202).

I/O interface set 206 allows for input and output of data with other devices that may be connected locally in data communication with server computer 200. For example, I/O interface set 206 provides a connection to external devices 214. External devices 214 will may include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, RM 300, can be stored on such portable computer-readable storage media. In these embodiments, the relevant software may (or may not) be loaded, in whole or in part, onto persistent storage 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature, herein, is used merely for convenience, and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
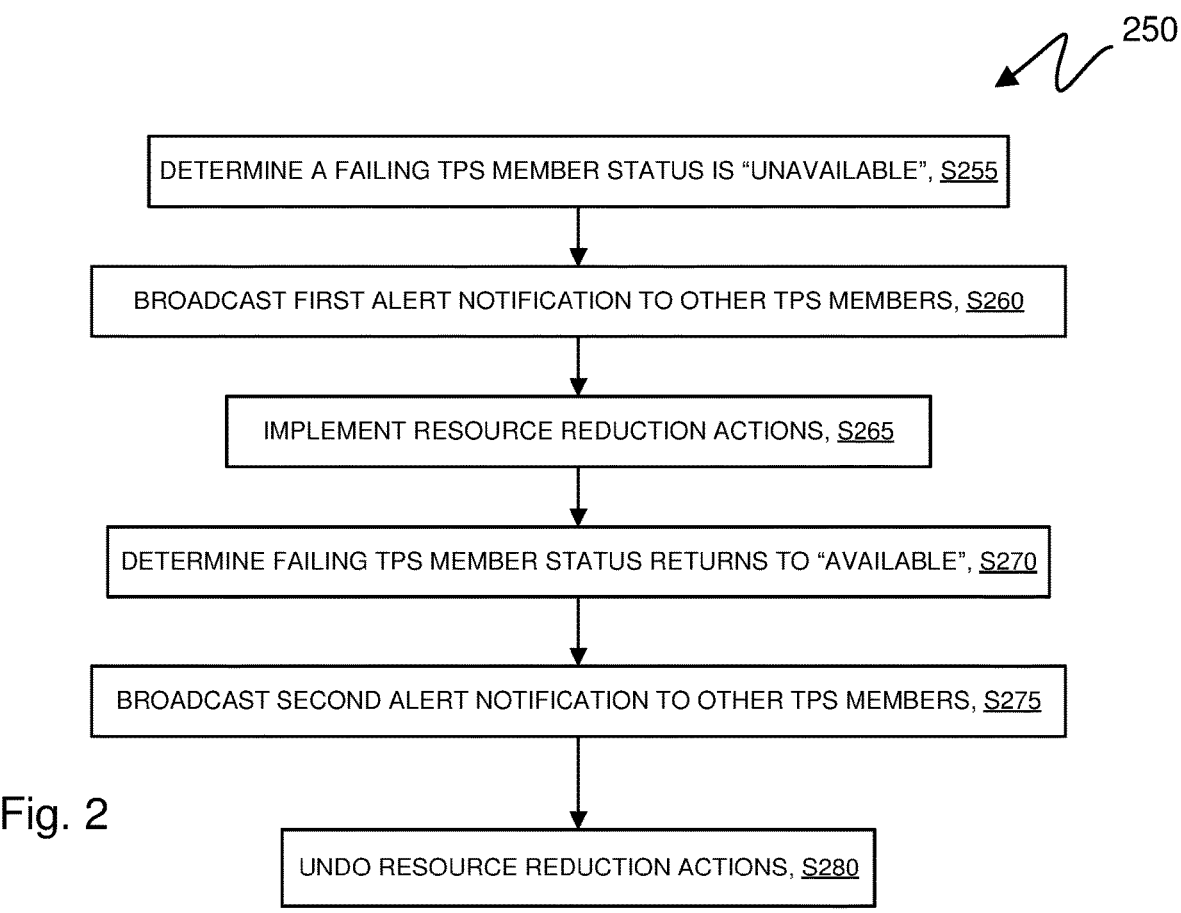
FIG. 2 is a flowchart showing a method performed, at least in part, in accordance with at least one embodiment of the present invention.
Figure 3:
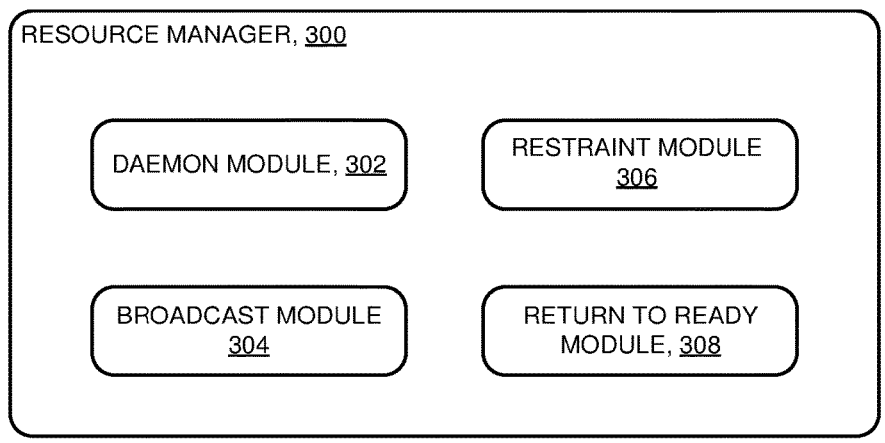
FIG. 3 is a block diagram showing a machine logic (for example, software) portion of a system in accordance with at least one embodiment of the present invention.

FIG. 2 shows flowchart 250 depicting a method according to the present invention. FIG. 3 shows resource manager (RM) 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where daemon module 302, of resource manager (RM 300), determines as "unavailable," status of a first transaction processing system (first TPS) member associated with RM 300. The first TPS is a member of a group of TPS members that work in concert to handle incoming transaction requests. In some embodiments, RM 300 is hosted by the first TPS, and each TPS member of the group hosts a separate instance of RM 300. Alternatively, in some embodiments, one or more instances of RM 300 reside outside associated TPS members (for example on separate computer hardware), such that if the TPS member fails, RM 300 will be able to continue operating, and not be impacted by the TPS failure.

RM 300 monitors the first TPS member for conditions that impact the availability of the first TPS member to process transaction requests, including incoming requests and those already in-progress. RM 300 monitors the first TPS member by observing one or more characteristics associated with performance and/or availability of the first TPS member. Example characteristics include: rate of incoming transactions, where a sudden and/or unexpected drop in the rate may indicate a network failure; time to process transactions, where, for example, an unusually long time to process a transaction may indicate central processing unit CPU throttling due to temperature issues; CPU clock frequency; frequency, number and/or rate of error occurrences; CPU utilization; memory read and/or write latencies, or any other metric associated with memory access; storage read and/or write latencies, or any other metric associated with storage access; and/or network communication status, etc., to name a few characteristics.

Examples of conditions that can impact TPS member availability include (without limitation): a network failure or interruption; hardware failure (such as a processor, storage, or memory device, or interruption in power supply, etc.); a software failure (such as an operating system, virtual machine or application crash); and/or excessive workload leading to TPS failure due to exhaustion of computing, memory, and/or storage resources, etc.

Daemon module 302 further monitors for notification messages received by the first TPS or RM 300, where the notification indicates a status (available, unavailable, etc.) of other TPS members of the group.

Processing proceeds at operation S260, where in response to determining that the first TPS has become unavailable, broadcast module 304, of RM 300, sends a notification to all other members of the TPS group, including a second TPS member. The notification includes information with respect to the failure of the first TPS member.

Alternatively, in some embodiments, manual or automatically generated commands, direct broadcast module 304 to send a notification to members of the TPS group, directing the members to enter "restraint" mode. While not in response to a TPS member failure, such a command may be issued so as to better enable the TPS group to handle a particularly heavy workload, such as may occur periodically at certain "busy" times. Such resource consumption reduction actions may enable a TPS system to handle the busy times without needing to bring on more TPS processing resources.

Processing proceeds at operation 265, where in response to receiving the notification, restraint module 306 of RM 300, associated with the second TPS member, implements actions (and/or causes the second TPS member to implement actions) that reduce resource usage by the second TPS member. In other words, restraint module 306 causes a reconfiguration of the second TPS member to "restraint mode" and thus to consume less resources.

Once in "restraint mode", the second TPS member reduces resource consumption by taking at least the following actions: making transaction instance blocks (TIBs) lighter, to use less memory; implementing delay factors to help control transaction flow; disabling diagnostic traces; disabling TPS dumps (at least for non-terminating problems); and cancelling idle transactions with greater frequency.

Processing proceeds at operation 270, where daemon module 302, of RM 300, determines the first TPS status has returned to "available".

Alternatively, in some embodiments, daemon module 302, of RM 300, determines that a new TPS member has been added to the TPS group, and that status of the new TPS member is "available", thus replacing the first TPS member.

Processing proceeds at operation S272, where in response to determining that the first TPS status has returned to "available" (or that a new TPS member has become available in the TPS group), broadcast module 304, of RM 300, sends a notification to all other members of the TPS group, including the second TPS member. The notification includes information with respect to the return to availability (or replacement) of the first TPS member.

Processing proceeds at operation 280, where in response to receiving the notification, restraint module 306 of RM 300, associated with the second TPS member, reverses (undoes) the actions implemented in operation S265 above, thus returning the second TPS member to a normal processing configuration.

III. FURTHER COMMENTS AND/OR EMBODIMENTS

A transaction processing system (TPS) comprises multiple physical systems working as a group to process incoming transaction workload in real time. Individual transactions may be put onto transaction one or more queues to facilitate sharing of the transaction workload among TPS group members. Each transaction may be processed by any one of the physical systems to meet required response-time criteria.

Each transaction processed by a TPS consumes system resources within the group member that processes the transaction. Infrastructure for commonly processed transactions is duplicated across TPS members. However, a subset of transactions (preferential transactions) may be directed to certain TPS members for processing, for efficiency or other reasons. Physical system resources used by a TPS include resources required to process common transactions (processed by any TPS member), as well as additional resources required for processing preferential transactions.

When a TPS group member suffers a catastrophic failure (meaning the member is unable to process transactions), the common transaction workload must be distributed among the surviving TPS group members, placing additional burden on physical system resources associated with the surviving members. Further, each TPS group member creates the infrastructure for processing transactions previously preferentially processed on only the failing TPS group members. The resulting additional preferentially processed transaction infrastructure requires an even larger level of physical system resources to be used among the remaining TPS group members.

If a TPS group member fails, the TPS group enters a "critical time period" that starts when the TPS member fails, and ends when the failing TPS member recovers and restarts, or is replaced by a new member added to the group. During this critical time period, the sudden increase in required physical resources that falls onto the surviving TPS group members may cause the surviving TPS group members to encounter catastrophic failures of their own, in a cascading effect, due to reaching resource limitations of their physical systems.

Some embodiments of the present invention comprise a method and system for creating a resource manager (RM). The RM allows members of a TPS to work together to handle large web-related banking workloads and survive a catastrophic failure of one or more members of the TPS group.

The resource manager is a new component of each member of a TPS group. In the event of a catastrophic failure, the RM streamlines system resource utilization on the remaining TPS group members to prevent system resource exhaustion and subsequent catastrophic failure of those members.

The RM component is designed with four modes: (i) ready mode; (ii) broadcasting mode; (iii) restraint mode; and (iv) return to ready mode. The modes will now be described as follows:

Ready mode—RM is initialized and awaits notification for: (i) a catastrophic failure from the TPS system on which it is installed; and (ii) an unavailable status message sent from a TPS group member in broadcasting mode. In some embodiments, an RM instance hosted on a TPS system comprises a daemon that performs one or more responsive actions when triggered by the host TPS system, or by a notification message from another instance of RM.

Broadcasting mode—The RM enters broadcasting mode to send TPS member "unavailable" and "available" status messages to surviving TPS group members.

In response to a TPS member encountering a failure, the failing TPS member calls an RM instance, hosted by the failing TPS member, and commands the RM to enter "broadcasting mode" to send "unavailable status" messages to surviving TPS group members. In some embodiments, the RM instance enters "broadcasting mode" in response to detecting a system termination process, or other indication of a failure with respect to the TPS on which the RM instance is installed.

In response to completion of a system restart process for the failing TPS member, RM broadcasting mode sends "available status" messages to surviving TPS group members. The "available status" message signals availability, of the formerly failing TPS member, to resume processing transaction workload within the TPS group.

Once RM completes sending of the "available status" messages, RM re-enters "ready mode".

Restraint mode—In response to receiving an "unavailable status" message corresponding to a failing TPS group member, surviving TPS group members enter restraint mode. In restraint mode, the RM controls and reduces the system resources used by the surviving TPS group members. Restraint mode enables surviving TPS systems to absorb increased transaction workload routed to these systems which would normally have been routed to and processed by the failing TPS group member.

A TPS group member remains in restraint mode during the critical time period, that is the time period that starts when the failing TPS group member fails and ends with the subsequent recovery and restart of the formerly failing TPS group member. More precisely, the critical time period (with respect to each surviving TPS group member) begins when a surviving TPS group member receives an "unavailable status" message, and ends when the surviving TPS group member receives the "available status" message. In some embodiments, the surviving TPS group members receive the "available status" message from a new TPS member, added to the group (that may be) designated as a replacement for the failing member.

In some embodiments of the present invention, restraint mode comprises the following tasks, for reducing usage, by surviving TPS group members, of system resources during a "critical time" (while a TPS group member is unavailable).
1. Make the transaction instance blocks lighter.
2. Activate a flood monitor with weighting factor.
3. Activate the transaction flow control with delay time factors.
4. Disable TPS diagnostic traces.
5. Disable TPS dumps for non-terminating problems.
6. Begin cancelling idle transactions with greater frequency.

In some embodiments, RM provides options (via a command interface or via automation) to activate and to deactivate "restraint mode" dynamically, for any chosen time period, to reduce system resource usage during that time period. RM users can also choose to activate "Restraint Mode" on a permanent full-time basis to reduce daily system resource usage.

The tasks outlined above, with respect to restraint mode, are described in greater detail below, with respect to the flowcharts of FIGS. 4-8.

Return to ready mode—Once all "available status" messages have been received by the surviving TPS group members, RM enters "return to ready mode" to undo the tasks performed by during "restraint mode". Once RM completes the "return to ready mode" process, RM (and consequently, the associated TPM) re-enters "ready mode".

Figure 4:
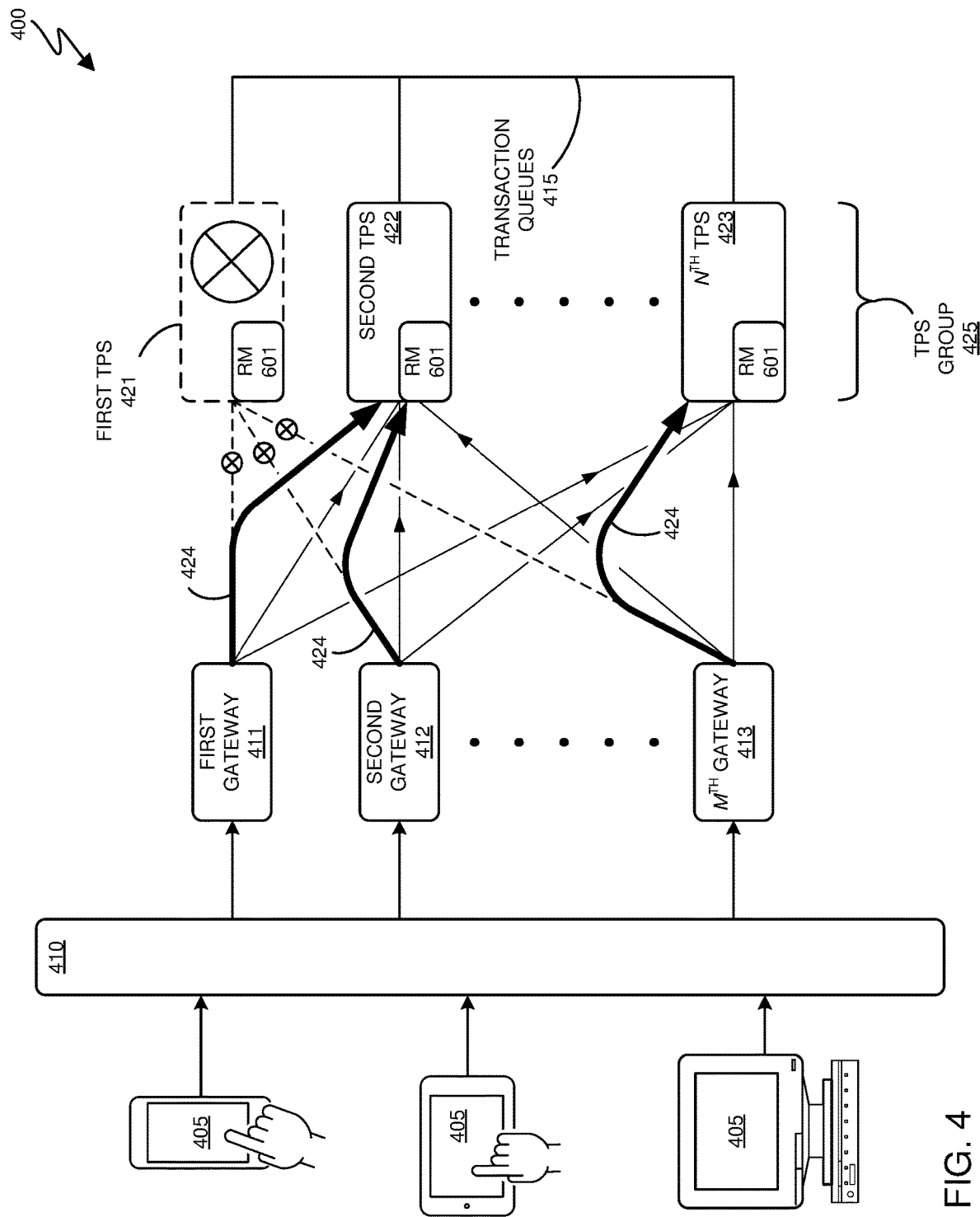
FIG. 4 is block diagram of a transaction processing system in accordance with at least one embodiment of the present invention.

FIG. 4 is a block diagram depicting high availability system 400 in accordance with at least one embodiment of the present invention. High availability system 400 comprises: any number of mobile and/or stationary user device 405; systems complex (sysplex) distributor 410; any number of transmission control protocol/internet protocol (TCP/IP) gateways including first gateway 411, second gateway 412, and $M^{th}$ gateway 413; transaction processing system (TPS) group 425, comprising any number of TPS members including first TPS 421, second TPS 422, and $N^{th}$ TPS 423; and transaction queues 415. Note: In some embodiments, the number of TCP/IP gateways (M) may, or may not, equal the number of TPS members (N).

Users generate transactions through user device 405 (mobile and/or stationary, such as smartphones, tablet, laptop, and desktop computers, smart watches, televisions, etc.) There may be any number of such systems operating concurrently, especially in a large enterprise-scale system such as an online payment system, or a media streaming service, etc.

In some embodiments, transactions arrive at sysplex distributor 410. Sysplex distributor 410 routes transactions to any available TCP/IP gateway. The TCP/IP gateway subsequently routes transactions to any available transaction processing system (TPS) member of TPS group 425. (Note: the term "Sysplex" may be subject to trademark rights in various jurisdictions throughout the world and are used here only in reference to the products or services properly denominated by the marks to the extent that such trademark rights may exist.)

To maintain a high degree of availability, members of TPS group 425 work together to avoid having a single point of failure. Each TPS member may have a preferred set (one or more) of input transaction type(s), for which the member is optimized to process efficiently. TCP/IP gateways route input transactions of a given type to TPS members optimized for the given transaction type.

Any TPS member may make a transaction available, on transaction queues 415, for any TPS member of the group to process. Any TPS member may create a transaction instance block (TIB), to represent an input transaction, or to process a transaction from another TPS member of the group. Each TIB consumes system resources.

Now consider a scenario wherein first TPS 421 becomes unavailable, by reason of system failure, network failure, or any other cause that prevents first TPS 421 from processing transactions assigned to it. Such a failure is herein sometimes referred to as an "emergency situation". In response to the failure, the system redirects transaction workload, which would have been directed to first TPS 421 (see FIG. 4, heavy lines 424), to one or more surviving TPS members, for instance to second TPS 422 and $N^{th}$ TPS 423. First TPS 421 may also reassign workload to other TPS members of TPS group 425, by placing the workload on transaction queues 415.

Redirected transactions impose greater workload on surviving TPS members that receive the redirected transactions. Some surviving TPS members that receive the increased workload may potentially run out of system resources (due, at least in part, to the increased workload), causing them to crash. Each surviving TPS member (that receives the redirected workload) allocates TIBs associated with the redirected workload, associated with transactions placed on transaction queues 415 from first TPS 421. In an embodiment that processes large volumes of transactions, a correspondingly large volume (perhaps thousands, or more) of new TIBs associated with the redirected workload can overwhelm surviving TPS members.

In some embodiments, such as a large transaction processing system, restarting an unavailable or failing TPS member may take five to ten minutes. During this critical time window, surviving TPS members may be sufficiently impacted as to lead to individual TPS system failure, and even a cascading failure of TPS group 425 altogether.

A surviving TPS member running out of system resources may cause creation of a flood of new TIBs, corresponding to the workload redirected to surviving members. And if one TPS member goes down, it may start a cascading failure sequence, where workload piles up on surviving TPS members causing more members to fail in turn, redirecting progressively heavier workload onto a diminishing number of survivors. In this type of scenario, the entire TPS system may quickly go down, in falling domino fashion, all triggered initially by failure of one TPS member.

Some embodiments of the present invention install an instance of "resource manager" (RM 601) for each member of TPS group 425. RM 601 helps TPS group 425 to survive when one or more TPS members become unavailable.

In some embodiments, RM 601 comprises a software component, installed in each corresponding TPS group member, to streamline the usage of system resources needed for processing transactions during an emergency situation, and to avoid a cascading outage as described above.

RM 601 has four processing modes: (i) broadcast; (ii) restraint; (iii) return to ready; and (iv) ready. Functions of the four modes are described below:

(i) Broadcast mode—A failing TPS member of a TPS group calls a corresponding instance of RM 601, in response to entering an initial dump formatting phase, associated with the failing TPS member going down. RM 601 broadcasts a notification message to some or all TPS members of the group. The broadcast notification indicates "unavailable" status with respect to the failing TPS member. Further, once the TPS member completes a restart and becomes available again, RM 601 broadcasts a notification message to the group, indicating "available" status with respect to formerly failing, and now recovered TPS.

In some embodiments, RM 601 broadcasts the "unavailable" notification to TPS members having the same preference as the failing TPS. That is, if the failing TPS has a preference (is optimized) for processing credit card payment transactions, RM 601 broadcasts the "unavailable" notification to surviving TPS members that also have a preference for processing credit card payment transactions. Concurrently, the gateways, through which transactions are received and distributed to members of the TPS group, redirect credit card payment transactions to TPS members that have the same preference as the failing TPS member. This minimizes adverse impact to processing credit card payment transactions in the absence of the failing TPS member. In some embodiments, if the surviving TPS members are in danger of becoming, or do become, overwhelmed by the additional workload (for example, if average time to process incoming transactions increases above a pre-determined threshold), some of the additional workload may be redirected to other TPS members, regardless of preferences, in which case RM 601 broadcasts the "unavailable" notification to the other TPS members.

(ii) Restraint mode—In response to receiving the broadcast notification with respect to the failing TPS member, surviving TPS members enter into restraint mode. When operating in restraint mode, TPS members control system resources in such a way as to manage the increased workload and prevent system failure during the critical window (while the failing TPS member is unavailable).

(iii) Return to Ready mode—Once the (formerly) failing TPS member becomes available again, (or a replacement TPS member is introduced into the group, surviving TPS members enter into "return to ready mode" to undo the special tasks performed in restraint mode.

(iv) Ready mode—In "ready mode," no actions are needed from RM 601, other than to stand ready to respond to failure, or imminent failure of a TPS member of the group. RM 601 detects imminent failure of a TPS group member based in part on actual resource usage compared to maximum resource usage that is available to the TPS group member. RM 601 determines imminent failure if the actual resource usage is changing in an increasing direction and remains above an "action" threshold for a pre-determined time span.

In some embodiments of the present invention, RM 601, when in restraint mode (see item (ii) above) performs "special" tasks including: (a) make the transaction instance blocks lighter; (b) activate a flood monitor with weighting factor; and (c) activate a transaction flow control with delay time factor:

(a) Make the Transaction Instance Blocks Lighter.

Each TIB comprises a base part and on-demand parts. The base part is always needed for transaction processing. The on-demand parts are for specific operations, such as receiving transaction input and delivering transaction output.

In restraint mode, the TPS creates TIBs with the base part only, to consume less system resources. The other parts of TIBs are built or created on demand (that is when the operation is needed). Further, the RM scans existing TIBs which had been created before the TPS entered restraint mode. If any on-demand part of an existing TIB is not used, the TPS releases storage associated with the existing TIB.

Moreover, RM marks TIBs created for the new workload (new TIBs, which had been originally targeted to the failing/unavailable TPS), such that the processing TPS releases new TIBs first (ahead of other TIBs), once RM exits restraint mode, that is once RM enters "return to ready" mode or "ready" mode.

(b) Activate a Flood Monitor with Weighting Factor.

Since light TIBs are used when the TPS is in restraint mode, the RM accounts for the smaller TIB size when calculating whether the flood limit has been reached for the number of all TIBs allocated.

For example, consider a light TIB, absent the on-demand parts (for example, input and output parts) that is 20% smaller than a regular TIB. The resulting 20% storage reduction factor, referred to as a "weighting factor" goes into calculating an adjusted TIB flood limit X for flood control.

In some embodiments, the adjusted TIB flood limit X is determined using the following formula:

$$X = A + (0.2 \times B) + (0.5 \times C) + (0.7 \times D)$$

where

A is the number of full size TIBs

B is the number of TIBs with base part only (light TIBs)

C is the number of TIBs with base part and on-demand fields for input

D is the number of TIBs with base part and on-demand fields for output 0.2, 0.5, and 0.7 (respectively equivalent to 20%, 50% and 70%) are example weighting factors applied respectively to the B, C, and D numbers. These example weighting factors may vary from one embodiment to another.

(c) Activate a Transaction Flow Control with Delay Time Factor.

RM activates a delay time factor function for input transactions by adding a delay time to an input transaction in response to the TPS reaching a high usage percentage of a pre-defined flood threshold. The delay time factor helps to reduce the impact to resource constraint resulting from receiving increased input transactions from, for example, mobile devices. This allows a TPS to delay creation of some TIBs, thus consuming less system resources.

For example, if a TPS reaches 60% of the pre-defined flood threshold, the TPS assigns a 5 millisecond delay time to a new input transaction before the TPS accepts the input transaction. If the TPS reaches 70% of the flood threshold, the TPS assigns a 10 millisecond delay time. In other words, the TPS dynamically increases or decreases delay times as the flood situation respectively deteriorates or improves. Note: the values given here (60%, 70%, 5 milliseconds, and 10 milliseconds), are examples only. Some embodiments define a different set of flood threshold percentages and corresponding delay times. Some embodiments define a linear or non-linear functional relationship between fraction of flood threshold reached (TPS loading) and responsive delay time. Further, some embodiments build in a degree of hysteresis in the loading/delay time relationship such that different delay times kick in at different loading breakpoints when loading changes in an increasing direction as opposed to a decreasing direction.

In addition to "special" tasks (a), (b), and (c) described above, RM, in restraint mode, performs the following tasks: (iv) disables TPS diagnostic traces to save storage space; (v) disables TPS dumps for non-terminating problems; and (vi) cancels idle transactions with increased frequency to save storage space.

Flowcharts 500A, 500B, 500C, 500D, and 500E, respectively of FIGS. 5A, 5B, 5C, 5D, and 5E, collectively depict a method, in accordance with embodiments the present invention, for determining: (i) source of a transaction processing system (TPS) failure-related notification message; and (ii) actions performed, in restraint mode, by resource manager (RM 601; see FIG. 4) in response to the TPS failure-related notification. A TPS embodiment corresponding to the methods depicted in the flowcharts, comprises TPS group 425 including at least first and second TPS members (first TPS 421, and second TPS 422, respectively; see FIG. 4).

Processing begins at operation 501, where an instance of RM corresponding to first TPS 421 (hereinafter referred to as RM 601) receives a notification, associated with an emergency situation, involving a member of TPS group 425 (a TPS failure-related notification). The notification could have originated from first TPS 421, or from any other TPS member of TPS group 425. For simplicity, the failing TPS will be referred to as second TPS 422 (see FIG. 4).

Figure 5A:
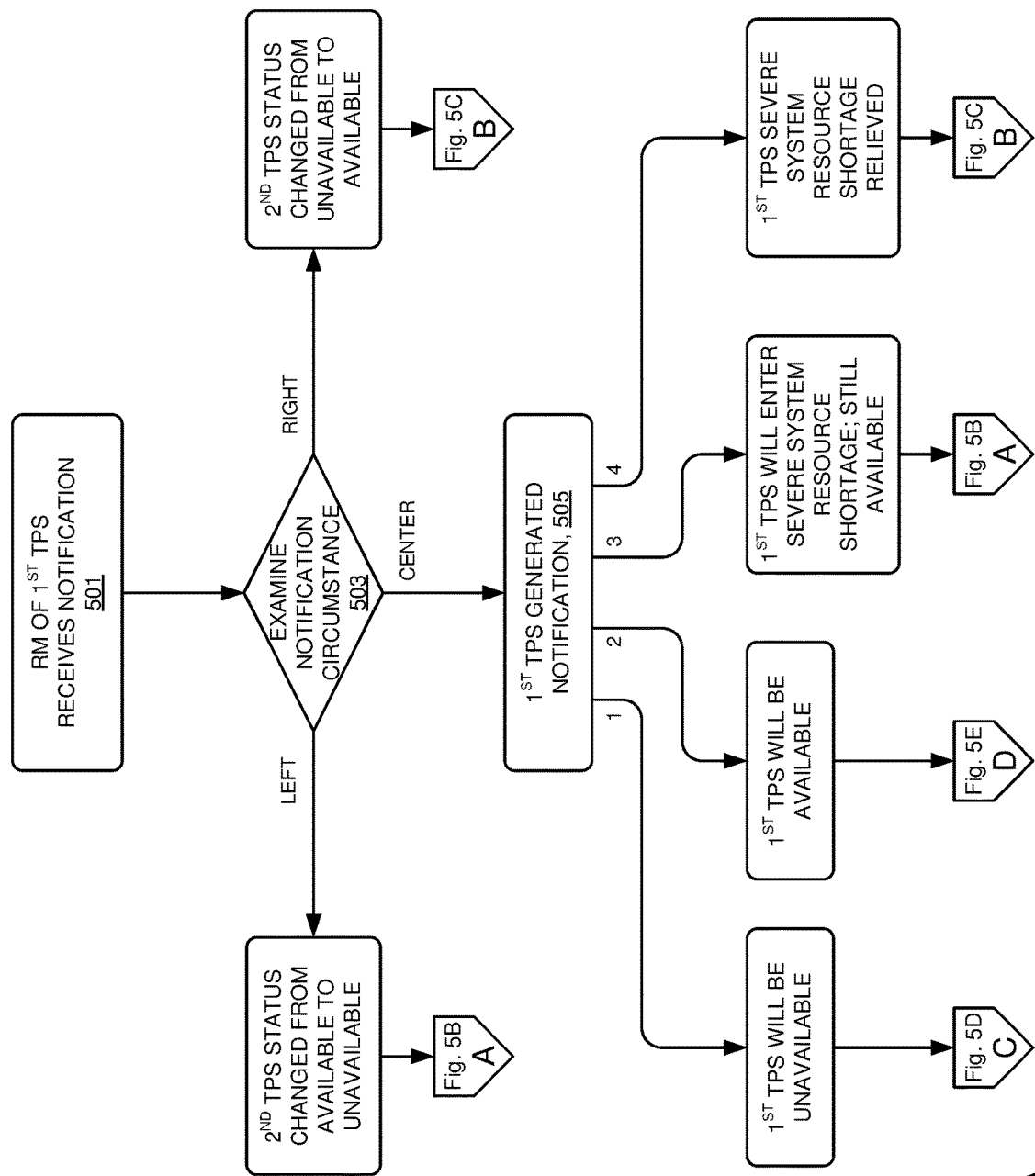
FIG. 5A is a flowchart showing a method performed, at least in part, in accordance with at least one embodiment of the present invention.
Figure 5B:
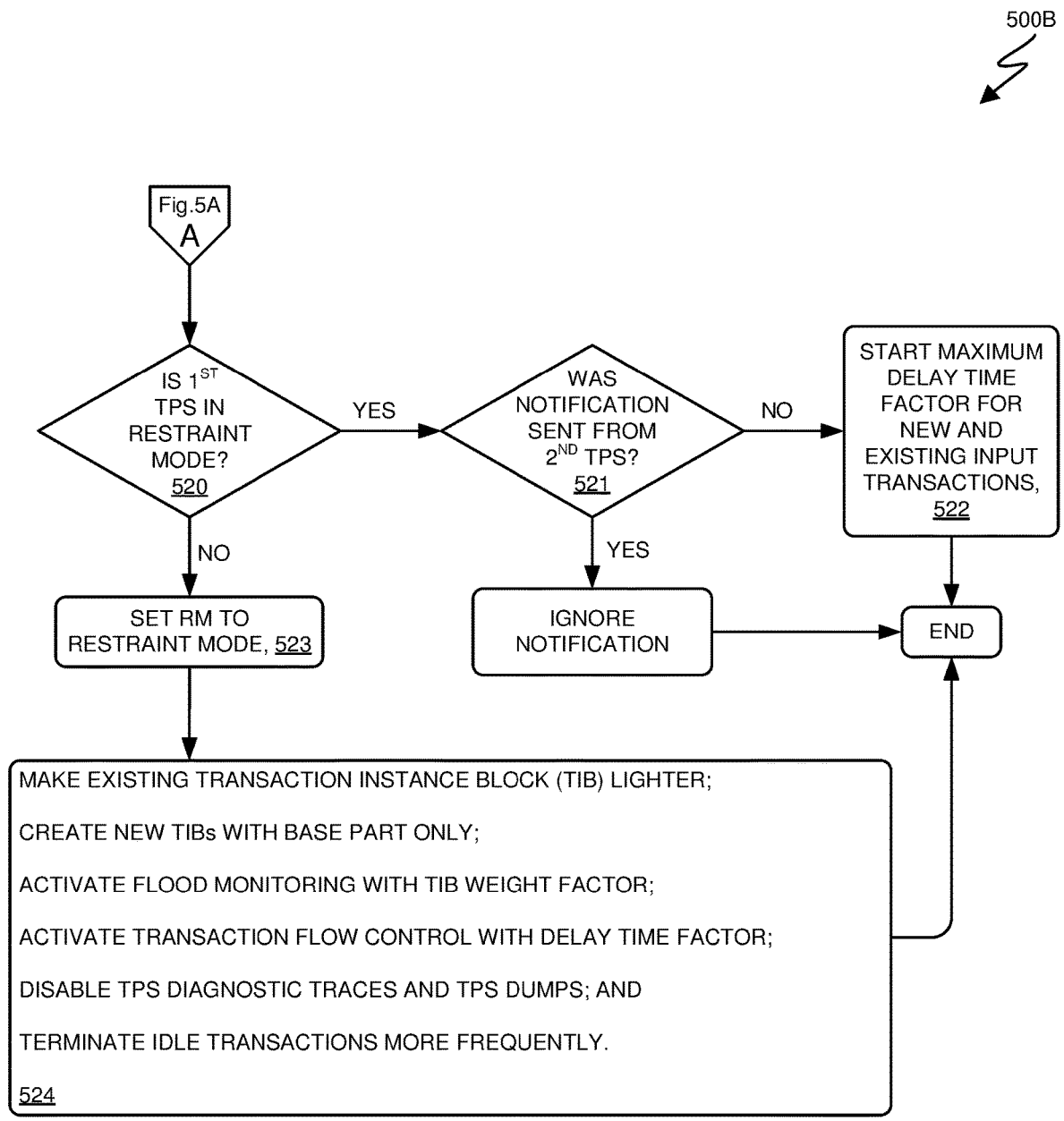
FIG. 5B is a flowchart showing a method performed, at least in part, in accordance with at least one embodiment of the present invention.

Processing proceeds at decision 503, where RM 601 determines the source of, and circumstances related to, the notification. If RM 601 determines the notification comes from second TPS 422, and second TPS 422 status has changed from available to unavailable (decision 503, "Left" branch), processing proceeds at entry point A of flowchart 500B (FIG. 5B).

Figure 5C:
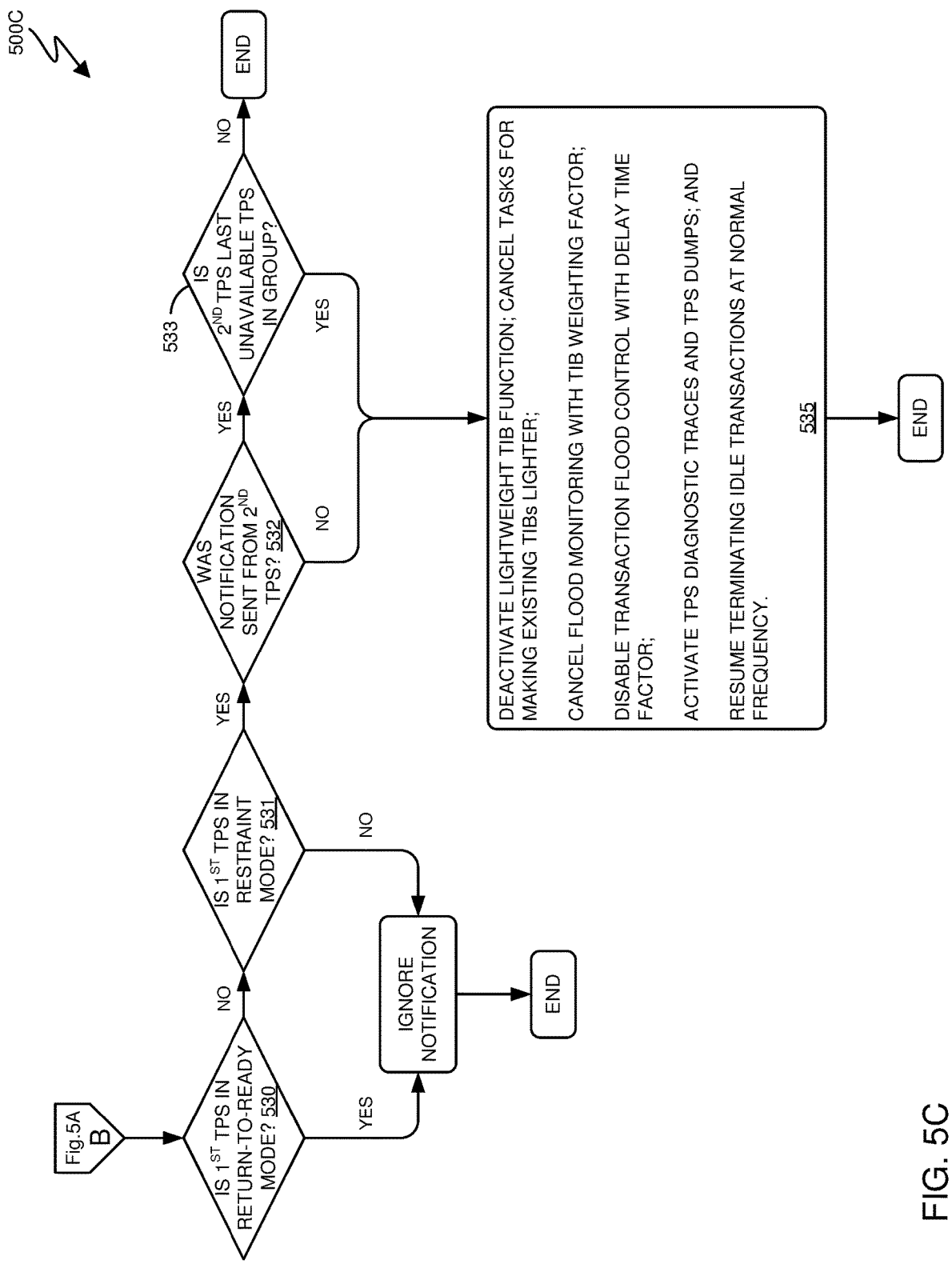
FIG. 5C is a flowchart showing a method performed, at least in part, in accordance with at least one embodiment of the present invention.

If RM 601 determines the notification comes from second TPS 422, and second TPS 422 status has changed from unavailable to available (decision 503, "Right" branch), processing proceeds at entry point B of flowchart 500C (FIG. 5C).

If RM 601 determines the source of the notification is first TPS 421 (decision 503, "Center" branch), processing proceeds at selection operation 505.

Figure 5D:
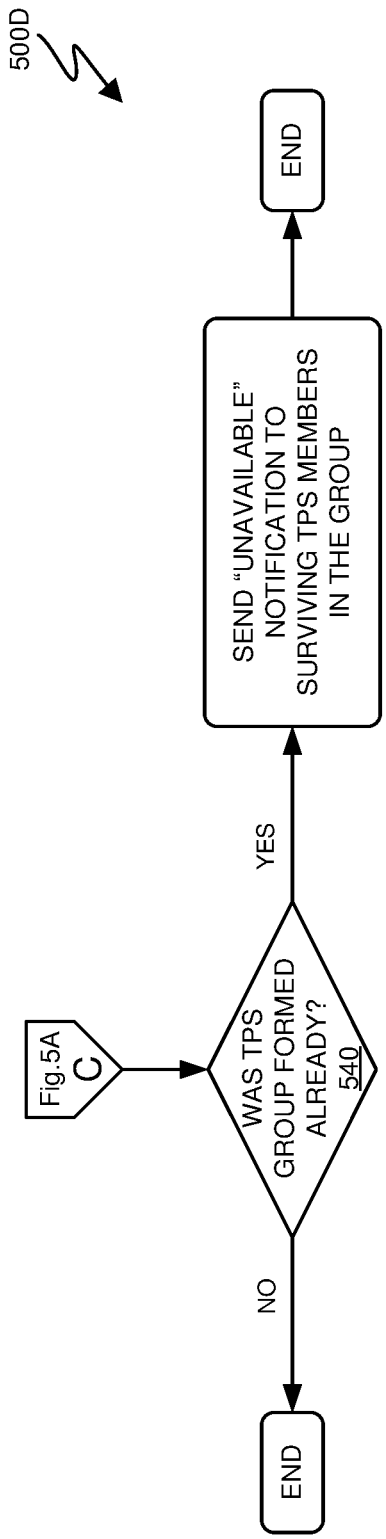
FIG. 5D is a flowchart showing a method performed, at least in part, in accordance with at least one embodiment of the present invention.

If RM 601 determines that first TPS 421 state changes from "available" to "unavailable" (selection operation 505, "1" branch), processing proceeds at entry point C of flowchart 500D of FIG. 5D.

Figure 5E:
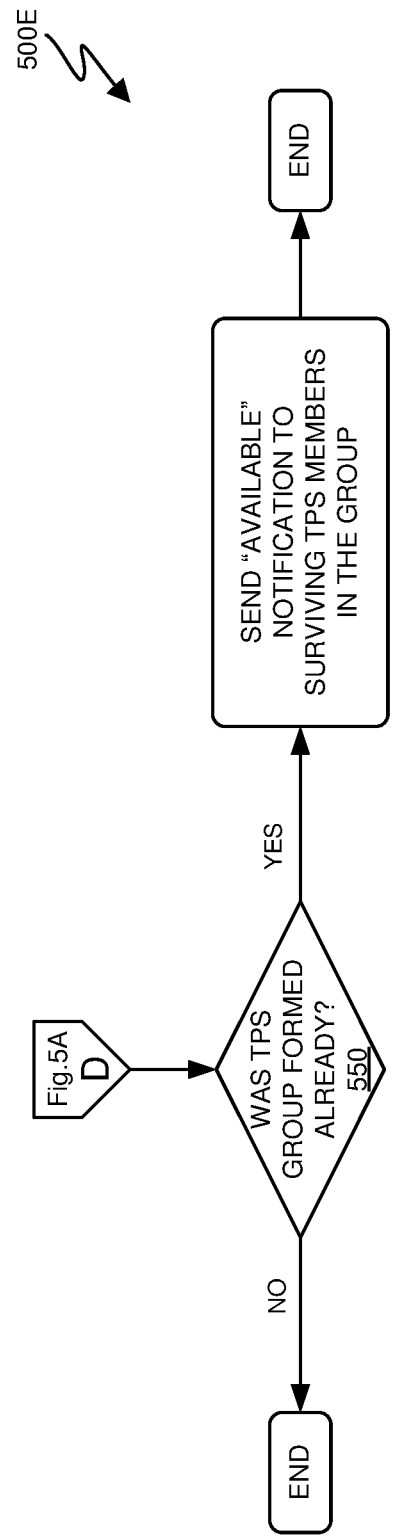
FIG. 5E is a flowchart showing a method performed, at least in part, in accordance with at least one embodiment of the present invention.

If RM 601 determines that first TPS 421 state changes from "unavailable" to "available" (selection operation 505, "2" branch), processing proceeds at entry point D of flowchart 500E of FIG. 5E.

If RM 601 determines that first TPS 421 enters a state of severe system resource shortage, yet remains "available" (selection operation 505, "3" branch), processing proceeds at entry point A of flowchart 500B of FIG. 5B.

If RM 601 determines that first TPS 421 emerges from the state of severe system resource shortage (the shortage has been relieved) (selection operation 505, "4" branch), processing proceeds at entry point B of flowchart 500C of FIG. 5C.

Turning now to flowchart 500B of FIG. 5B (entry point A, continuation from flowchart 500A of FIG. 5A), processing proceeds at decision 520, where RM 601 determines whether first TPS 421 is in restraint mode.

If RM 601 determines that first TPS 421 is in restraint mode (decision 520, "Yes" branch), processing proceeds at decision 521 where RM 601 determines whether the notification was sent from second TPS 422. If RM 601 determines that the notification was sent from second TPS 422 (decision 521, "Yes" branch), RM 601 ignores the notification.

If the notification was not sent from second TPS 422 (decision 521, "No" branch), RM 601 starts a maximum delay time factor for incoming (new) transactions and existing transactions (already received by first TPS 421 and in queue to be processed).

If RM 601 determines that first TPS 421 is not in restraint mode (decision 520, "No" branch), processing proceeds at operation 523, where RM 601 enters restraint mode.

Processing proceeds at operation 524 where RM 601 performs the following tasks, not necessarily in the following order: (i) make existing transaction instance blocks (TIBs) lighter; (ii) create new TIBs with base part only; (iii) activate flood monitoring with TIB weight factor; (iv) activate transaction flow control with delay time factor; (v) disable TPS diagnostic traces and TPS dumps; and (vi) begin terminating idle transactions more frequently.

Turning now to flowchart 500C of FIG. 5C (entry point B, continuation from flowchart 500A of FIG. 5A), processing proceeds at decision 530, where RM 601 determines whether first TPS 421 is in a "return-to-ready" mode.

If RM 601 determines that first TPS 421 is not in a "return-to-ready" mode (decision 530, "No" branch), processing proceeds at decision 531, where RM 601 determines whether first TPS 421 is in a "restraint" mode.

If RM 601 determines that first TPS 421 is in "restraint" mode (decision 531, "Yes" branch), processing proceeds at decision 532, where RM 601 determines whether the notification was sent from second TPS 422.

If RM 601 determines that the notification was sent from second TPS 422 (decision 532, "Yes" branch), processing proceeds at decision 533, where RM 601 determines whether second TPS 422 is the only unavailable TPS in TPS group 425.

If RM 601 determines that second TPS 422 is not the only TPS in TPS group 425 that remains unavailable (decision 533, "No" branch), in other words, at least one other member of TPS group 425 is unavailable, processing ends.

Returning to decision 530, if RM 601 determines that first TPS 421 is in a "return-to-ready" mode (decision 530, "Yes" branch), RM 601 ignores the notification.

Returning to decision 531, if RM 601 determines that first TPS 421 is not in "restraint" mode (decision 531, "No" branch), RM 601 ignores the notification.

Returning to decision 532, if RM 601 determines that the notification was not sent from second TPS 422 (decision 532, "No" branch), processing proceeds at operation 535.

Returning to decision 533, if RM 601 determines that second TPS 422 is the only TPS in TPS group 425 that remains unavailable (decision 533, "Yes" branch), in other words, there are no other members of TPS group 425 that are unavailable, processing proceeds at operation 535.

At operation 535, RM 601 performs the following tasks, not necessarily in the following order: (i) deactivate lightweight TIB function; cancel tasks for making existing TIBs lighter (consuming less system resources); (ii) cancel flood monitoring with TIB weighting factor; (iii) disable transaction flood control with delay time factor; (iv) activate TPS diagnostic traces and TPS dumps; and (v) resume terminating idle transactions at normal frequency.

Turning now to flowchart 500D of FIG. 5D (entry point C, continuation from flowchart 500A of FIG. 5A), processing proceeds at decision 540, where RM 601 determines whether first TPS 421 (the transaction processing system from which originated the failure notification) is part of a TPS group (for example TPS group 425; see FIG. 4).

If RM 601 determines that first TPS 421 is part of a TPS group (decision 540, "Yes" branch), RM 601 sends an "unavailable" notification, with respect to first TPS 421, to surviving TPS members of TPS group 425.

Turning now to flowchart 500E of FIG. 5E (entry point D, continuation from flowchart 500A of FIG. 5A), processing proceeds at decision 550, where RM 601 determines whether first TPS 421 (the transaction processing system from which originated the failure notification) is part of a TPS group (for example TPS group 425; see FIG. 4).

If RM 601 determines that first TPS 421 is part of a TPS group (decision 550, "Yes" branch), RM 601 sends an "available" notification, with respect to first TPS 421, to surviving TPS members of TPS group 425.

The following paragraphs give various use case examples: (i) catastrophic system failures of one or more members of a TPS group; (ii) single TPS system flooded with transactions; (iii) TPS group with heavier than normal system resource usage; and (iv) large transaction processing system with a single TPS or a TPS group wishing to save operation costs by reducing system resource usage.

(i) Catastrophic System Failures of One or More Members of a TPS Group.

For a large banking customer with multiple transaction processing systems (TPS) installed, one or more TPS can go down due to reasons including a transaction flood, a transaction routing issue, a long I/O wait, or an internal latch problem. Before a failing TPS completes system restart, the surviving TPS in the group can quickly run out of system resources due to the rerouted transaction workloads from the failing TPS. With the TPS resource manager (RM) installed, RM detects the catastrophic system failure. RM performs internal actions on the surviving TPS group members, to switch in and out of the various RM processing modes, including "restraint mode", to save the system resources to avoid further catastrophic outages of the remaining TPS group members. Thus, a TPS group with RM installed can avoid a series of catastrophic outages.

(ii) Single TPS System Flooded with Transactions.

For a small banking customer with a single TPS installed, millions of transactions from mobile devices can be submitted into the TPS in a short period of time. TPS can then be in a severe flood situation and crash when the TPS runs out of the system resources. In some embodiments of the present invention system automation dynamically activates RM "restraint mode" in response to reaching a defined flood threshold, to reduce system resources. RM acts proactively to prevent a catastrophic failure to any member of a TPS group. In some embodiments, system automation deactivates RM "restraint mode" dynamically, once a transaction flood subsides. In some embodiments, RM provides a means for human intervention to activate and/or deactivate RM, or specific components thereof.

(iii) TPS Group with Heavier than Normal System Resource Usage.

In some embodiments of the present invention, at for example a large banking customer with multiple TPSs operating as a TPS group, one prioritized TPS group member receives major transaction workloads from various gateways. If system resources run low (for example, resource usage levels exceed an action threshold level) on the prioritized TPS group member, system automation dynamically activates RM "restraint mode", with respect to some or all TPS group members, to reduce system resource usage. If system resource usage levels drop below an action threshold (for example, return to normal levels), the RM automatically deactivates "restraint mode". By this function, RM prevents member(s) of the TPS group from unexpectedly going down with a catastrophic system failure.

(iv) Large Transaction Processing System with a Single TPS, or a TPS Group Wishing to Save Operation Costs by Reducing System Resource Usage.

A large industry TPS (for example, a TPS that focuses mainly on customer analytics) may use RM to run in "restraint mode" on a full-time basis to reduce overall system resource overhead. Running RM in this way may result in lower operating costs associated with the TPS. In some embodiments, the RM is activated automatically during system initialization or restart. Some embodiments provide means for RM to be activated manually.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard as to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and/or application-specific integrated circuit (ASIC) based devices.

What is claimed is:

1. A computer-implemented method comprising:
   determining a first status of unavailable, for a first transaction processing system (TPS) member of a group of TPS members, wherein the first TPS member comprises a first resource manager (RM);
   in response to determining the first status of the first TPS member, broadcasting from the first RM a first message received at a second RM of a second TPS member of the group of TPS members, wherein the first message includes information with respect to the first status of the first TPS member; and
   in response to receiving the first message, causing the second TPS member to implement a resource usage reduction action based on the first message.

2. The method of claim 1, further comprising:
   determining a second status of available for the first TPS member;
   in response to determining the second status of the first TPS member, broadcasting a second message to the second TPS member, wherein the second message includes information with respect to the second status of the first TPS member; and
   in response to receiving the second message, reversing, by the second TPS member, the resource usage reduction action.

3. The method of claim 2, wherein reversing the resource usage reduction action is selected from the group consisting of: making a third TIB that includes an on-demand part; creating a fourth TIB based on a corresponding transaction request; enabling creation of a second diagnostic trace; enabling a second system dump;
   and decreasing a frequency of cancelling a second plurality of idle transactions.

4. The method of claim 1, wherein the resource usage reduction action is selected from the group consisting of: making a first transaction instance block (TIB) that excludes an on-demand part; basing a flood monitor on a number of TIBs that exclude respectively corresponding on-demand parts; delaying creation of a second TIB based on a delay time factor; disabling creation of a first diagnostic trace; disabling a first system dump; and increasing a frequency of cancelling a first plurality of idle transactions.

5. The method of claim 1, further comprising:
   installing a plurality of instances of a resource manager, including a first instance and a second instance, wherein each instance of the resource manager is associated with a respectively corresponding TPS member of the group of TPS members.

6. The method of claim 1, wherein determining the first status of the first TPS member further comprises:
   monitoring a performance characteristic of the first TPS member.

7. The method of claim 6, wherein a performance characteristic is selected from the group consisting of: a rate of incoming transactions; a time to process a transaction; a clock frequency of a central processing unit (CPU); a frequency of error occurrences; a number of error occurrences; a rate of error occurrences; a CPU utilization metric; a memory access metric; a storage access metric; and a network communication parameter.

8. A computer program product comprising:
   one or more computer readable storage media, and program instructions collectively stored on the one or more computer readable storage media, the program instructions comprising instructions programmed to perform:

determining a first status of unavailable, for a first transaction processing system (TPS) member of a group of TPS members, wherein the first TPS member comprises a first resource manager (RM);

in response to determining the first status of the first TPS member, broadcasting from the first RM a first message received at a second RM of to a second TPS member of the group of TPS members, wherein the first message includes information with respect to the first status of the first TPS member; and in response to receiving the first message, causing the second TPS member to implement a resource usage reduction action based on the first message.

9. The computer program product of claim 8, further comprising instructions programmed to perform:

determining a second status of available for the first TPS member;

in response to determining the second status of the first TPS member, broadcasting a second message to the second TPS member, wherein the second message includes information with respect to the second status of the first TPS member; and in response to receiving the second message, reversing, by the second TPS member, the resource usage reduction action.

10. The computer program product of claim 9, wherein reversing the resource usage reduction action is selected from the group consisting of: making a third TIB that includes an on-demand part; creating a fourth TIB based on a corresponding transaction request; enabling creation of a second diagnostic trace; enabling a second system dump; and decreasing a frequency of cancelling a second plurality of idle transactions.

11. The computer program product of claim 8, wherein the resource usage reduction action is selected from the group consisting of: making a first transaction instance block (TIB) that excludes an on-demand part; basing a flood monitor on a number of TIBs that exclude respectively corresponding on-demand parts; delaying creation of a second TIB based on a delay time factor; disabling creation of a first diagnostic trace; disabling a first system dump; and increasing a frequency of cancelling a first plurality of idle transactions.

12. The computer program product of claim 8, further comprising instructions programmed to perform:

installing a plurality of instances of a resource manager, including a first instance and a second instance, wherein each instance of the resource manager is associated with a respectively corresponding TPS member of the group of TPS members.

13. The computer program product of claim 8, wherein determining the first status of the first TPS member further comprises instructions programmed to perform:

monitoring a performance characteristic of the first TPS member.

14. The computer program product of claim 13, wherein a performance characteristic is selected from the group consisting of: a rate of incoming transactions; a time to process a transaction; a clock frequency of a central processing unit (CPU); a frequency of error occurrences; a number of error occurrences; a rate of error occurrences; a CPU utilization metric; a memory access metric; a storage access metric;

and a network communication parameter.

15. A computer system comprising:
a processor set; and
one or more computer readable storage media;
wherein:
the processor set is structured, located, connected and/or programmed to run program instructions stored on the one or more computer readable storage media; and the program instructions include instructions programmed to perform:

determining a first status of unavailable, for a first transaction processing system (TPS) member of a group of TPS members, wherein the first TPS member comprises a first resource manager (RM);

in response to determining the first status of the first TPS member, broadcasting from the first RM a first message received at a second RM of to a second TPS member of the group of TPS members, wherein the first message includes information with respect to the first status of the first TPS member; and in response to receiving the first message, by causing the second TPS member to implement a resource usage reduction action based on the first message.

16. The computer system of claim 15, further comprising instructions programmed to perform:

determining a second status of available for the first TPS member;

in response to determining the second status of the first TPS member, broadcasting a second message to the second TPS member, wherein the second message includes information with respect to the second status of the first TPS member; and in response to receiving the second message, reversing, by the second TPS member, the resource usage reduction action.

17. The computer system of claim 16, wherein reversing the resource usage reduction action is selected from the group consisting of: making a third TIB that includes an on-demand part; creating a fourth TIB based on a corresponding transaction request; enabling creation of a second diagnostic trace; enabling a second system dump;

and decreasing a frequency of cancelling a second plurality of idle transactions.

18. The computer system of claim 15, wherein the resource usage reduction action is selected from the group consisting of: making a first transaction instance block (TIB) that excludes an on-demand part; basing a flood monitor on a number of TIBs that exclude respectively corresponding on-demand parts; delaying creation of a second TIB based on a delay time factor; disabling creation of a first diagnostic trace; disabling a first system dump; and increasing a frequency of cancelling a first plurality of idle transactions.

19. The computer system of claim 15, further comprising instructions programmed to perform:

installing a plurality of instances of a resource manager, including a first instance and a second instance, wherein each instance of the resource manager is associated with a respectively corresponding TPS member of the group of TPS members.

20. The computer system of claim 15, wherein determining the first status of the first TPS member further comprises instructions programmed to perform:

monitoring a performance characteristic of the first TPS member;

wherein a performance characteristic is selected from the group consisting of: a rate of incoming transactions; a time to process a transaction; a clock frequency of a central processing unit (CPU); a frequency of error occurrences; a number of error occurrences; a rate of error occurrences; a CPU utilization metric; a memory access metric; a storage access metric; and a network communication parameter.

* * * * *